United States Patent [19]
Miyazaki et al.

[11] 4,348,617
[45] Sep. 7, 1982

[54] IMAGE PICKUP DEVICE

[75] Inventors: Kenichi Miyazaki, Sagamihara; Tadayoshi Miyoshi, Yokohama; Itsuo Takanashi, Yokohama; Shintaro Nakagaki, Yokohama; Koichiro Motoyama, Ninomiya; Sumio Yokokawa, Yokohama, all of Japan

[73] Assignee: Victor Company of Japan, Ltd., Yokohama, Japan

[21] Appl. No.: 201,735

[22] Filed: Oct. 29, 1980

[30] Foreign Application Priority Data

Oct. 31, 1979 [JP] Japan .................. 54/141069

[51] Int. Cl.³ .................................. H01J 29/56
[52] U.S. Cl. .......................... 315/370; 315/382; 313/384
[58] Field of Search .................. 315/370, 371, 382; 313/384, 389, 390; 358/41, 51

[56] References Cited

U.S. PATENT DOCUMENTS 3,412,281 11/1968 Richards, Jr. et al. ............. 315/382
3,801,848 4/1974 van Roosmalen et al. ........ 315/389

Primary Examiner—Theodore M. Blum
Attorney, Agent, or Firm—Louis Bernat

[57] ABSTRACT

An image pickup device comprises an image pickup tube having a target scanned by an electron beam and a pair of electrodes which form a collimation, a voltage applying circuit for respectively applying predetermined voltages for forming the collimation to the collimation forming electrodes of the image pickup tube, and a correction voltage applying circuit for applying a correction voltage which varies the voltage ratio of the collimation forming electrodes to one of the collimation forming electrodes, upon scanning of the peripheral parts of an effective scanning surface of the target by the electron beam. The collimation is formed responsive to a voltage ratio of the voltages applied to each of the collimation forming electrodes and changed in response to the correction voltage.

8 Claims, 6 Drawing Figures

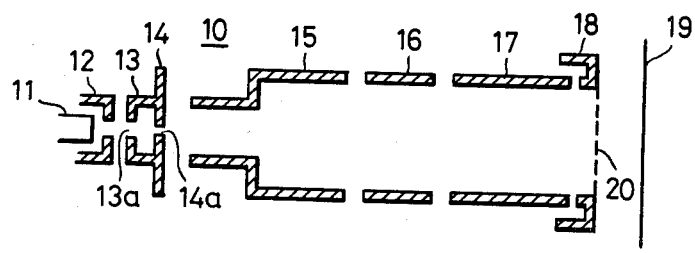
FIG. 1
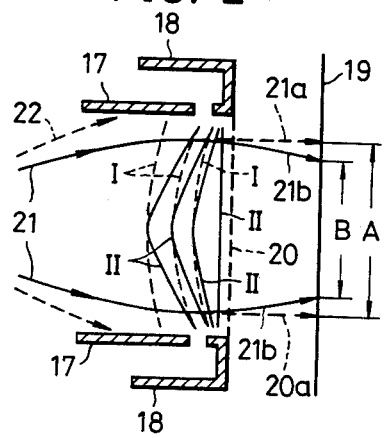
FIG. 2
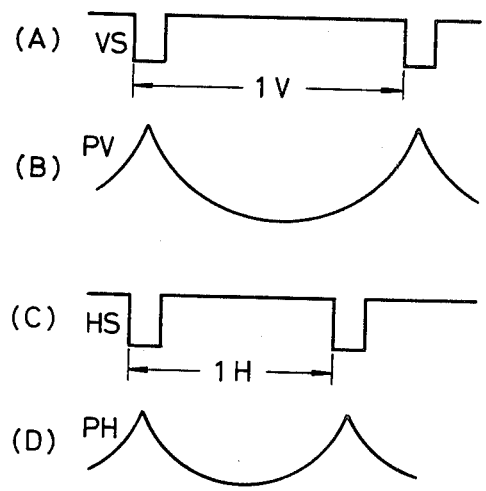
FIG. 4
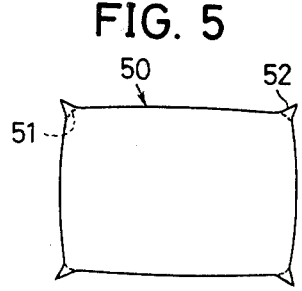
FIG. 5
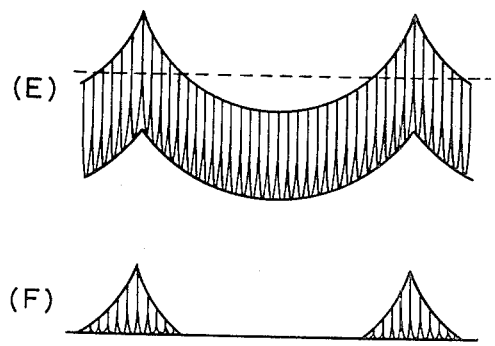

IMAGE PICKUP DEVICE

BACKGROUND OF THE INVENTION

The present invention relates to image pickup devices, and more particularly to a highly sensitive and high resolution image pickup device capable of picking up images without generating distortions around the peripheral parts of the picture screen. A voltage of a predetermined correction waveform is applied to a grid of the image pickup tube of the image pickup device.

Generally, as compared to a magnetic focus type image pickup tube, in an electrostatic focus type image pickup tube, a focus coil on a deflection yoke can be eliminated, and the miniaturization of the image pickup camera is facilitated, hence often being used nowadays. However, especially when the above type is used in a color television camera, high sensitivity and high resolution is required of the image pickup device.

In order to obtain normalized and high resolution of the image pickup tube throughout a whole target surface, the voltage ratio which forms the collimation of the image pickup tube must be set to a value higher than a certain value.

However, as will be described in the following in conjunction with the drawings, when the above voltage ratio is set to a high value, the equipotential line of the collimation electronic lens curves by a large amount, and thus the electron beam which passes through this collimation electronic lens is bent by a large amount. Accordingly, the area of the effective scanning surface on the target surface which is scanned by the electron beam becomes small.

On the other hand, in order to set the sensitivity of the image pickup tube to a high value, the area of the effective scanning surface of the targert surface which is traced by the electron beam must be large.

When the collimation voltage ratio is set to a value larger than a predetermined value in order to otain both high resolution and high sensitivity in the image pickup tube, and when the incidence range of the electron beam entering the collimation electron lens as incident light is set to a large value in order to set the area of the effective scanning surface to a large value, the electron beam hits the inner wall of the grid used for the formation of the collimation electronic lens. Therefore, when the video signal obtained by the image pickup performed by use of the image pickup tube in the above state is reproduced on the picture screen of the receiver, distortion is introduced at the peripheral parts of the picture screen, especially at the four corners of the picture screen.

SUMMARY OF THE INVENTION

Accordingly, it is a general object of the present invention to provide a novel and useful image pickup device in which the above described problems have been overcome.

Another and more specific object of the invention is to provide an image pickup device constructed so that a correction voltage of a predetermined waveform existing near the horizontal and vertical blankings of the horizontal and vertical scanning periods, respectively, is applied to one of collimation forming electrodes of the image pickup tube. According to the device of the present invention, distortion is not introduced at the peripheral parts of the picture screen, especially at the four corners of the picture screen.

Still another object of the invention is to provide an image pickup device capable of obtaining clear video output, by eliminating the unwanted differential component of the above correction voltage due to the stray capacitance between the electrodes of the image pickup tube.

Further objects and features of the present invention will be apparent from the following detailed description when read in conjunction with the accompanying drawings.

BRIEF DESCRIPTION OF THE DRAWINGS

FIG. 1 is a diagram for describing the simplified construction of an electrode structure of an example of a general electrostatic focus type image pickup tube;

FIG. 2 is an enlarged view of a grid part for forming a collimation electronic lens in the above tube;

FIGS. 4(A) through 4(F) are, respectively, graphs showing the signal waveforms for describing the operations of the parabolic wave generation circuit and correction wave generation circuit of the device of FIG. 3;

FIG. 5 is a diagram showing the state of a picture screen of a monitor television receiver.

DETAILED DESCRIPTION

Figure 3:
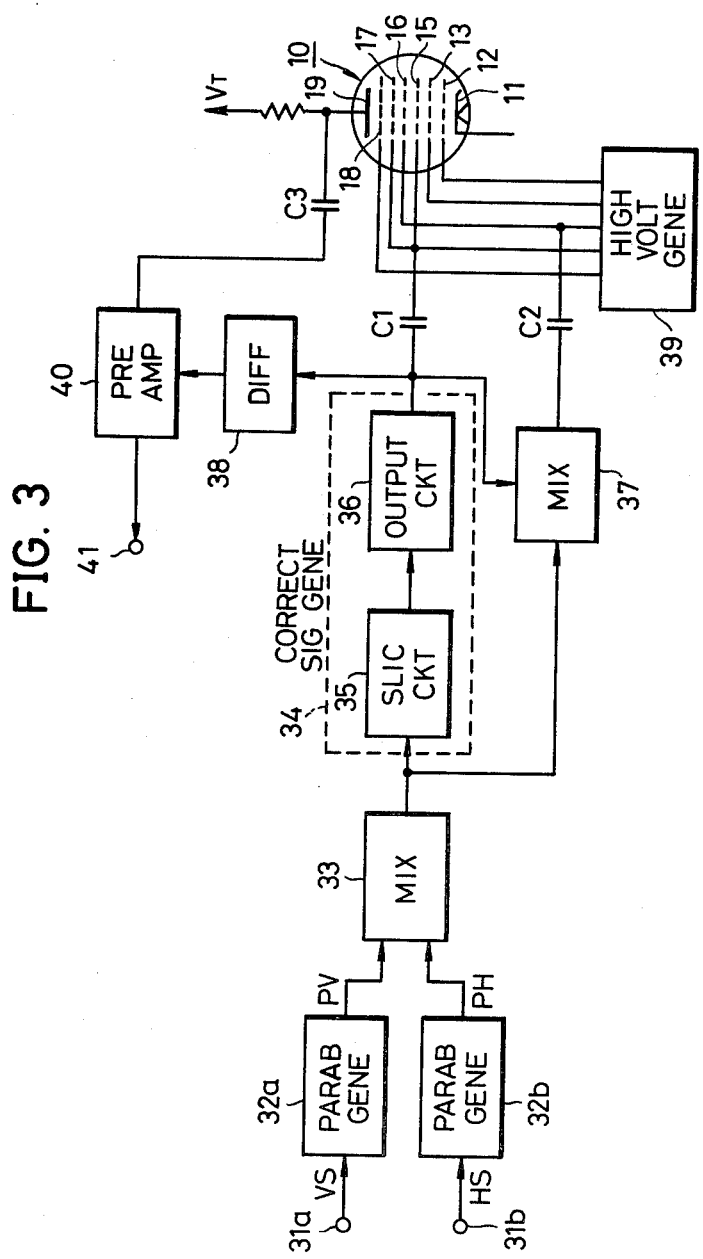
FIG. 3 is a systematic block diagram showing one embodiment of an image pickup device of the present invention.

Generally, an electrostatic focus magnetic deflection type image pickup tube comprises an electrode structure shown in FIG. 1. An electron beam emitted from a cathode 11 of an image pickup tube 10 is controlled of its beam flow by a first grid 12, and passes through a hole 13a of a second grid 13 which interrupts the high voltage of the grid in the next stage. This electron beam further passes through a beam limiting hole 14a of a beam disc 14 which is of the same electric potential as the second grid 13, and focused on a target 19 so that the spot becomes a minimum spot by use of a main lens formed by a third, fourth, and fifth grids 15, 16, and 17. The electron beam is then focused by a collimation electronic lens formed by the fifth grid 17 and a sixth grid 18, controlled so that the focused beam lands on the target 19 vertically, and scans the surface of the target 19. A mesh 20 is provided on the sixth grid 18.

Parts of the fifth and sixth grids 17 and 18, and target 19 are enlarged and shown in FIG. 2. The equipotential line of the collimation electronic lens formed by the fifth and sixth grids 17 and 18 becomes of the form shown by the dotted lines I or the solid lines II of FIG. 2. The ratio $V_2/V_1$ (here $V_2 > V_1$) between a voltage $V_1$ applied to the fifth grid 17, and a voltage $V_2$ applied to the sixth grid 18, is a voltage ratio (collimation ratio) which forms the collimation. When this voltage ratio is set to a small value, an equipotential line is formed having a form shown by the dotted lines I, and when the voltage ratio is set to a large value, an equipotential line is formed having a form shown by the solid lines II of FIG. 2.

In the case where the electron beam focused by the above electronic lens is incident in a direction shown by the solid-line-arrow from the left-hand-side direction of FIG. 2, the beam travels in a form shown by the dottedline-arrow 21a by the collimation electronic lens having an equipotential line shown by the dotted lines I, and scans within a range shown by A on the target 19. However, when the above voltage ratio is set to a large value in order to make the value of resolution large, the beam travels in a form shown by the solid-line-arrow 21b due to the collimation electronic lens having an equipotential line shown by the solid lines II, and traces within a range shown by B on the target 19. Accordingly, when the above voltage ratio is set to a large value in order to make the value of resolution large, the scanning range of the electron beam on the target 19 becomes small, and the sensitivity becomes low. But when the incidence direction of the electron beam is simply changed to that shown by the dotted lines 22 in order to make the scanning range of the electron beam large on the target 19, the electron beam hits the inner wall of the fifth grid 17. Hence, if the signal obtained from the image pickup tube 10 is supplied to a monitor image receiver in the above state, distortion parts 52 are introduced at the peripheral parts of an image picture screen 50 of the monitor television receiver, especially at the four corner edges 51, as shown in FIG. 5.

Hence, the present invention perceived on the point that, when the voltage ratio forming the above collimation is varied, the effective scanning range on the target surface by the electron beam varies. Accordingly, the voltage ratio which forms the collimation is set to a small value at the electron beam scanning part on the target surface corresponding to the peripheral parts of the picture screen (especially at the four corners), in order to prevent the generation of picture distortion due to the hitting of the electron beam against the inner wall of the fifth grid 17. In the other parts, the voltage ratio which forms the collimation is set at a large value, and a voltage is applied to the grid of the image pickup tube in order to set the value of the resolution to a large value.

A circuit which realizes the above functions will now be described in conjunction with the systematic block diagram of FIG. 3. A vertical synchronizing pulse VS of one vertical scanning period (1V) shown in FIG. 4(A) and a horizontal synchronizing pulse HS of one horizontal scanning period (1H) shown in FIG. 4(C) of the television camera, are respectively supplied to parabolic wave generating circuits 32a and 32b from input terminals 31a and 31b. In FIGS. 4(C) and 4(D), the graphs are shown with the time-axis enlarged (elongated) compared to those of FIGS. 4(A) and 4(B). The parabolic wave generating circuits 32a and 32b respectively comprise known circuit construction, in which saw-tooth waves are formed by integrating the input synchronizing pulses and further integrating the waves so obtained to form parabolic waves, and provide as output, parabolic waves PV and PH shown in FIGS. 4(B) and 4(D) with respect to the input synchronizing pulses VS and HS, respectively. Each parabolic waves PV and PH respectively comprise peaks at positions corresponding to the centers of the synchronizing pulses VS and HS. Moreover, triangular wave generating circuits can be used instead of the parabolic wave generating circuits 32a and 32b.

The above parabolic waves PV and PH are both supplied to and mixed by a mixer 33. Accordingly, a signal of the waveform shown in FIG. 4(E) is obtained from the mixer 33. The envelope of the above signal is same as that of parabolic wave PV, having vertical scanning period, and although the numbers are abbreviated, the vertical lines show the parabolic wave PH having horizontal scanning period.

The output mixed parabolic wave signal from the mixer 33 is supplied to a slicing circuit 35 of a correction signal generating circuit 34, and a mixer 37. The slicing circuit 35 slices the mixed parabolic wave signal of FIG. 4(E) at a level shown by dotted lines of the same figure, and obtains a correction signal shown in FIG. 4(F). This correction signal exist in the beginning and end parts of the vertical scanning period, and its envelope comprises a peak within the vertical blanking period. The above correction signal comprises vertical scanning period parabolic waves sliced nearly to the form of triangular waves. Moreover, a horizontal scanning period parabolic wave sliced nearly to the form of triangular waves, having each peak within the horizontal blanking period and existing at the beginning and end parts of the horizontal scanning period, exist within the whole envelope.

The output correction signal of the slicing circuit 35 is supplied to a differentiating circuit 38 through the mixer 36, and also applied to the third and fifth grids 15 and 17 of the electrostatic focus magnetic deflection type image pickup tube 10 through a capacitor C1.

A DC voltage $V_T$ is applied to the target (anode) 19 of the image pickup tube 10, a blanking signal is applied to the cathode 11, and a high DC voltage from a high Dc voltage generating circuit 39 is applied to the first through sixth grids 12 through 18.

Of the fifth and sixth grids 17 and 18 which form the above collimation, the sixth grid 18 is only applied with a constant DC voltage $V_2$. On the other hand, a correction signal having a waveform of high level at the beginning and end parts of the vertical scanning period and horizontal scanning period, respectively, as shown in FIG. 4(F), is applied to the fifth grid 17 through the capacitor C1. Hence, the above voltage ratio $V_2/V_1$ which forms the collimation, becomes small, respectively, at the beginning and end parts of the vertical scanning period and horizontal scanning period, and becomes large in all other periods.

Accordingly, when the electron beam scans the peripheral parts of the effective scanning surface on the target, the above voltage ratio which forms the collimation becomes small. Therefore, the curvature of the equipotential line of the collimation electronic lens becomes small, and even if the electron beam is made to be incident in the direction shown by a solid line 21 of FIG. 2, the electron beam lands normally in the periphery of the effective scanning surface (the range shown by A) on the target 19. Thus there is no need to make the electron beam incident in the direction shown by the dotted lines 22, and distortion is not introduced at the peripheral parts of the picture screen. In addition, in the effective scanning surface parts other than the above peripheral parts, the correction voltage is not applied to the fifth grid 17, and hence the voltage ratio forming the above collimation is large, and high resolution can be obtained.

Furthermore, the focusing point of the electron beam generally exist in a spherical manner, but the target surface is flat, and thus, conventionally, a method called "dynamic focusing" is used so that the focusing state can be maintained throughout the whole target surface. This is a method in which the output of the mixer 33 of FIG. 3 is applied to the fourth grid 15 as it is. The dynamic focusing is also used in the present invention, however, as stated above, during the period in which the correction signal voltage is applied to the third and fifth grids 15 and 17, the condition of the main lens formed by the third through fifth grids 15 through 17 varies.

Therefore, in the device of the present invention, the correction signal from the correction signal generating circuit 34 is mied with the mixed parabolic wave from the mixer 33, at the mixer 37. The output signal of the mixer 37 is applied to the fourth grid 16 through a capacitor C2. Normally, for example, when the grid voltages at the third and fifth grids are both 750 volts and the grid voltage at the fourth grid is 150 volts, the output signal of the mixer 37 is applied to the fourth grids 17 so that the grid voltage ratio between the fifth (third) grid voltage and the fourth grid voltage is 5:1.

The video signal obtained from the target (anode) 19 of the image pickup tube 10 is supplied to a preamplifier 40 through a coupling capacitor C3, and added with a signal from the differentiating circuit 38. When the above correction signal voltage is applied to the fifth grid 17, the above correction signal is differentiated and this differentiated signal mixes into the output signal of the target 19 as unwanted signal, due to the stray capacitance between the fifth and sixth grids 17 and 18 and between the sixth grid 18 and the target 19. Accordingly, in this embodient, the differentiating circuit 38 is constructed so that it has the same time constant as that of the differentiating circuit formed by the stray capacitance between the electrodes and the negative resistance of the image pickup tube 10. Moreover, the differentiated signal from the differentiating circuit 38 having a polarity which eliminates the differentiated signal which is mixed in to the above output video signal, is supplied to the preamplifier 40.

Thus, a clear output video signal having eliminated the unwanted signal component due to the stray capacitance between the electrodes of the image pickup tube 10, can be obtained from an output terminal 41.

When the video signal obtained from the output terminal 41 is supplied to the monitor television receiver, a clear picture can be obtained on the picture screen 50 as shown in FIG. 5, having eliminated the distortion 52 introduced in the conventional system to a form shown in corner edges 51.

In the above embodiment, the voltage $V_2$ of the sixth grid 18 which forms the collimation is held constant, and the grid voltage $V_1$ is varied by applying the correction signal voltage to the fifth grid 17, but instead, the fifth grid voltage $V_1$ can be held constant and the voltage $V_2$ of the sixth grid 18 varied. In this case, the device can be organized so that the correction signal voltage shown in FIG. 4(F) is applied to the sixth grid 18 with the polarity reversed, and the voltage of the sixth grid 18 is small at the beginning and end parts of the vertical scanning period and horizontal scanning period, respectively.

Figure 6:
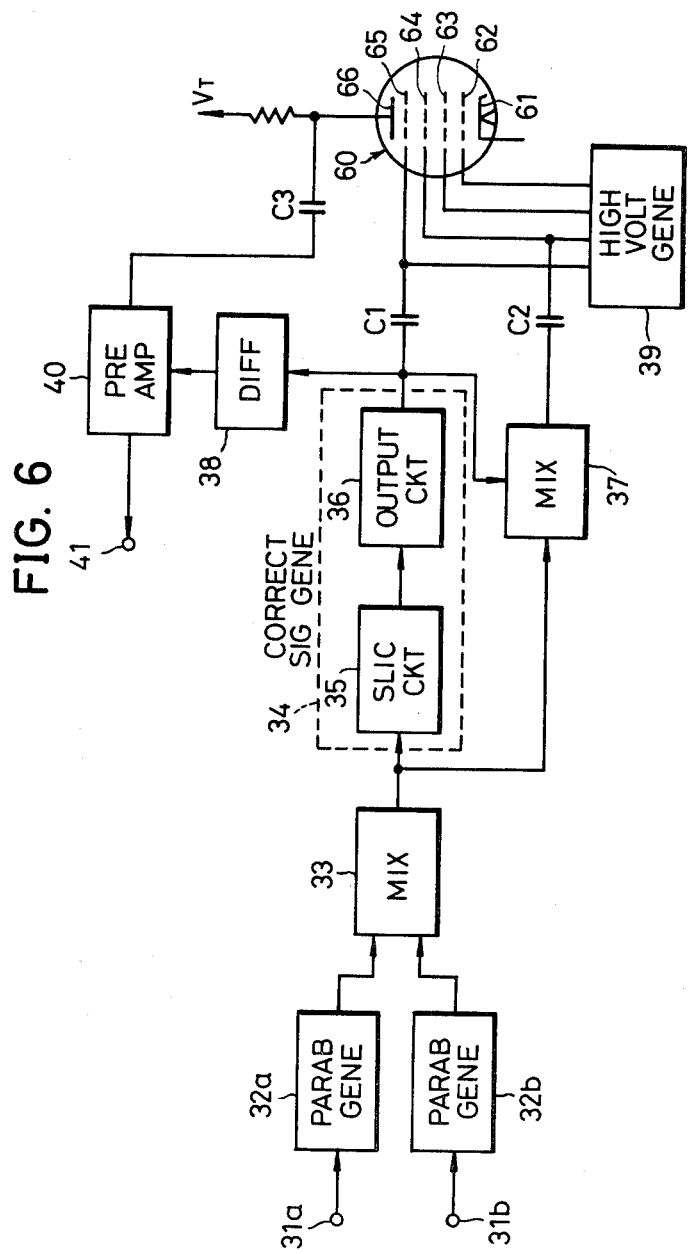
FIG. 6 is a systematic block diagram showing another embodiment of an image pickup device of the present invention.

The image pickup tube is not limited to the electrostatic focus magnetic deflection type, and can be of a magnetic focus magnetic deflection type as shown in the embodiment of FIG. 6. In FIG. 6, those parts which are the same as those corresponding parts in FIG. 3 are designated by the like reference numerals, and their description will be omitted.

A magnetic focus magnetic deflection type image pickup tube 60 comprises a cathode 61, a first, second, third, and fourth grids 62, 63, 64, and 65, and a target (anode) 66. The third grid 64 also functions as a focusing electrode. The voltage ratio between the third and fourth grids 64 and 65, is the voltage ratio which forms the collimation. The correction signal voltage from the correction signal generating circuit 34, is applied to a fourth grid 65 which forms the collimation and does not function as a focusing electrode, through the capacitor C1. The output signal from the mixer 37 is applied to the third grid 64 through the capacitor C2.

Further, this invention is not limited to these embodiments but various variations and modifications may be made without departing from the scope of the invention.

We claim:

1. An image pickup device comprising:
   an image pickup tube having a target scanned by an electron beam and a pair of electrodes which form a collimation;
   voltage applying means for respectively applying predetermined voltages for forming said collimation to said collimation forming electrodes of said image pickup tube, said collimation being formed responsive to a voltage ratio of said voltage applied to each of said collimation forming electrodes; and
   correction voltage applying means for applying a correction voltage which varies said voltage ratio of said collimation forming electrodes to one of said collimation forming electrodes, upon scanning of the peripheral parts of an effective scanning surface of said target by said electron beam.

2. A device as claimed in claim 1 in which said correction voltage applying means applies a correction voltage of a predetermined waveform existing at a horizontal scanning blanking period and its vicinity and at a vertical scanning blanking period and its vicinity of said electron beam scanning on said target.

3. A device as claimed in claim 2 in which said predetermined waveform is of a parabolic waveform.

4. A device as claimed in claim 1 in which said correction voltage applying means comprises a first parabolic wave generating circuit which generates a parabolic wave according to a vertical synchronizing signal, a second parabolic wave generating circuit which generates a parabolic wave according to a horizontal synchronizing signal, a mixing circuit which mixes the output signals of said first and second parabolic wave generating circuits, and a slicing circuit which slices the output from said mixing circuit at a predetermined level, said slicing circuit applying its output as a correction voltage to said one electrode.

5. A device as claimed in claim 1 in which said image pickup tube comprises an electrode which forms a main lens together with said one electrode of said collimation forming electrodes, and said correction voltage is also applied to said main lens forming electrode by a predetermined ratio with respect to the applied voltage to said one electrode.

6. A device as claimed in claim 4 in which said image pickup tube comprises two electrodes which form a main lens together with said one electrode of said collimation forming electrodes, said output of said slicing circuit being applied to said one electrode of said collimation forming electrodes and also to one of said main lens forming electrodes, and further comprises another mixing circuit which mixes the outputs of said mixing circuit and said slicing circuit, said other mixing circuit applying its output to the other electrode of said mian lens forming electrodes by a predetermined ratio with respect to the applied voltage to said one electrode of said collimation forming electrodes.

7. A device as claimed in claim 4 in which the other electrode of said collimation forming electrodes also functions as a focusing electrode, and which further comprises another mixing circuit which mixes the outputs of said mixing circuit and said slicing circuit, said other mixing circuit applying its output to said other electrode of said collimation forming electrodes.

8. A device as claimed in claim 4 which further comprises:

a differentiating circuit which differentiates said output of said slicing circuit; and a mixing circuit which mixes the output of said differentiating circuit to the output of said target with a polarity which eliminates the differential component of the correction voltage mixed into the target output of said image pickup tube, said correction voltage due to the capacitance between said electrodes of said image pickup tube.

* * * * *